Nov. 26, 1929.   R. C. ZUCKERMAN   1,736,960

POTATO DIGGER

Filed Aug. 16, 1926

INVENTOR.
R. C. Zuckerman
BY
ATTORNEY

Patented Nov. 26, 1929

1,736,960

UNITED STATES PATENT OFFICE

ROSCOE C. ZUCKERMAN, OF STOCKTON, CALIFORNIA

POTATO DIGGER

Application filed August 16, 1926. Serial No. 129,358.

This invention relates to improvements in potato digging and harvesting machines, my principal object being to provide a device of this character so constructed that with the forward movement of the machine the ground rearwardly of the digging mechanism will be flattened and smoothed out. While the potatoes as dug are preferably immediately sacked before leaving the machine, by means of the sacking apparatus shown in my Patent No. 1,639,832, dated August 23, 1927, under certain conditions the use of this sacking apparatus is not entirely feasible or is not desired. The potatoes as dug are instead allowed to drop onto the ground to the rear of the machine to be then gathered by hand, as is now ordinarily done. The digging mechanism, however, cuts up and loosens the dirt, rendering the ground surface behind the machine very uneven and lumpy. The potatoes falling on such surface are therefore apt to drop into the crevices in the dirt and become mingled with the clods so that it is very hard to gather the potatoes quickly and separate the same from the clods. The disadvantages and inconvenience arising from this feature are particularly had when the machine is working in a light peaty soil which when loosened by the digger becomes so light that the potatoes when they drop onto the same are very apt to bury themselves.

My improved apparatus, by pressing down and forming a smooth surface onto which the potatoes fall, avoids this burying of the potatoes and enables the gathering operations to be greatly facilitated and speeded up, as will be evident.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Referring now more particularly to the characters of reference on the drawings, the apparatus in its preferred form comprises a rigid side frame structure 1 of suitable character, adapted to be drawn along the ground by a tractor or other draft means. This frame is supported at its forward ends by transversely spaced wheels 2 and at its rear end by a single very wide faced wheel or roller 3, which extends the full distance between the side frames.

Figure 1:
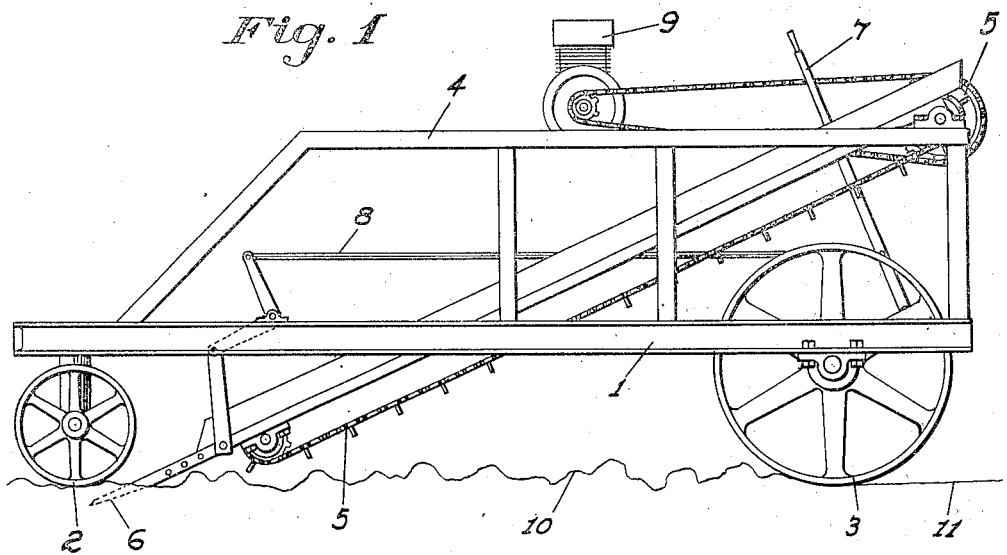
Fig. 1 is a side elevation of my improved apparatus.
Figure 2:
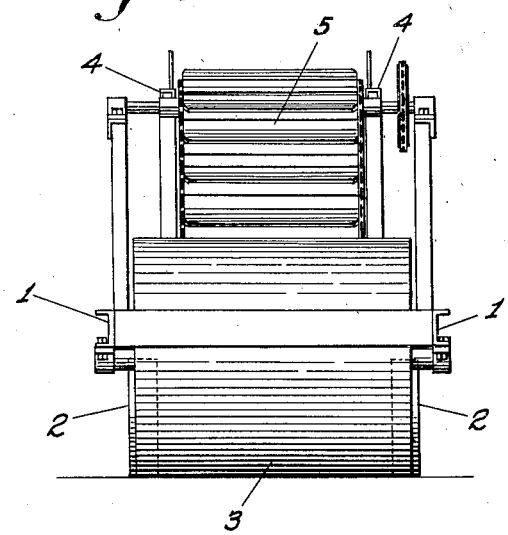
Fig. 2 is a rear end view of the same.

Pivoted onto the frame structure at its rear end and above the roller 3 are forwardly and downwardly depending transversely spaced frames 4 on and between which is mounted an endless conveyor 5 of suitable form, which conveyor is narrower than the roller 3. This conveyor is of the open wire and slat type as shown in Figure 2, so that as the potatoes are carried from the digging element the loose dirt sifts or screens through the same. Mounted in connection with the frames 4 at their lower ends is a potato digging mechanism of suitable form such as prongs 6, adapted to enter the ground at an acute angle so as to raise the potatoes to the surface with the forward movement of the machine. The conveyor is so disposed as to pick up the potatoes as they are dug and convey them up over the roller 3 to the rear end of the machine, from which they drop to the ground to the rear of said roller. The front end of the conveyor and digging unit may be raised and lowered as desired by any suitable means such as a lever 7 pivoted on the frame structure 1 and operatively connected to said conveyor adjacent its forward end by suitable linkage as at 8. The conveyor is driven in the proper direction by any desired means such for instance as a small gas engine 9 mounted on the main structure above the conveyor.

When the machine is moving forward and the digging mechanism is engaged with the ground, said ground rearwardly of the digger is naturally left in a very loose and irregular condition, as illustrated at 10, or else, if the land is of a very light nature, while possibly fairly smooth, it is in such a loose condition as to offer very little support for the potatoes dropping thereon and said potatoes sometimes embed themselves in the loose dirt. The roller 3 passing over such rough or loose surface and having a tread surface wider than the disturbed ground, the latter is packed down and smoothed out, as indicated at 11, so that a relatively hard and level surface is then provided onto which the potatoes from the upper rear end of the conveyor drop. The potatoes are thus left cleanly on top of the ground instead of being mixed with clods or partially embedded in the loose dirt, and the subsequent gathering operations are greatly facilitated.

Though I have shown and described a certain specific arrangement of the parts of the device as a whole, it is to be distinctly understood that the wide faced roller 3 disposed as stated relative to the other parts is the vital and important feature; and the type of digging mechanism and conveyor, the means for driving and controlling the latter, as well as the other features and arrangement of the parts, are capable of being altered to any extent desired without affecting the functioning and operation of the roller in the slightest degree.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A potato digger including a wheel mounted frame, a roller mounted on the frame to bear against the ground to flatten and smooth the same, a digging element carried by the frame a considerable distance ahead of the roller, and an intermediate conveyor adapted to convey the potatoes from the digging element and discharge them over the roller onto the smooth ground behind the same, the conveyor having openings therein whereby the loose dirt gathered with the potatoes will sift therethrough prior to the potatoes being discharged over the roller.

2. A potato harvester comprising a frame structure to be moved along the ground, a digging mechanism to engage the ground and raise the potatoes therefrom, a roller wider than the digging mechanism supporting the frame rearwardly of said mechanism, and a conveyor for raising the potatoes from the digging mechanism, mounted on the frame and extending rearwardly over the roller to enable the potatoes after being raised to drop onto the ground rearwardly of the roller, said roller being wider than the conveyor at its rear end to insure the potatoes dropping onto a smooth and flattened ground surface, the conveyor having openings therein whereby the loose dirt gathered with the potatoes will sift therethrough and drop onto the ground in front of the roller.

In testimony whereof I affix my signature.

ROSCOE C. ZUCKERMAN.